(12) United States Patent
Deng et al.

(10) Patent No.: US 9,544,380 B2
(45) Date of Patent: Jan. 10, 2017

(54) DATA ANALYTICS AND SECURITY IN SOCIAL NETWORKS

(71) Applicant: International Business Machines Corporation, Armonk, NY (US)

(72) Inventors: Yu Deng, Yorktown Heights, NY (US); Jenny S. Li, Danbury, CT (US); Liangzhao Zeng, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 13/860,129

(22) Filed: Apr. 10, 2013

(65) Prior Publication Data

US 2014/0310346 A1 Oct. 16, 2014

(51) Int. Cl.
*G06F 15/16* (2006.01)
*H04L 29/08* (2006.01)
*H04L 29/06* (2006.01)

(52) U.S. Cl.
CPC ........... *H04L 67/22* (2013.01); *H04L 63/0861* (2013.01); *H04L 63/1408* (2013.01); *H04L 67/306* (2013.01)

(58) Field of Classification Search
CPC .. H04L 67/22; H04L 63/0861; H04L 63/1408; H04L 67/306
USPC ........................................................ 709/204
See application file for complete search history.

(56) References Cited

U.S. PATENT DOCUMENTS

| 7,856,411 | B2 | 12/2010 | Darr |
| 8,150,779 | B1 | 4/2012 | Gauvin |
| 8,185,646 | B2 | 5/2012 | Headley |
| 8,548,811 | B2 * | 10/2013 | Begeja ................. H04W 12/06 379/114.14 |
| 8,646,073 | B2 * | 2/2014 | Raviv ............................ 726/22 |
| 8,725,672 | B2 * | 5/2014 | Rostampour et al. .......... 706/45 |
| 8,863,293 | B2 * | 10/2014 | Christodorescu et al. ..... 726/25 |
| 2008/0162338 | A1 * | 7/2008 | Samuels ................. G06F 21/40 705/38 |
| 2012/0137367 | A1 | 5/2012 | Dupont et al. |
| 2012/0150966 | A1 | 6/2012 | Fan et al. |
| 2012/0297477 | A1 * | 11/2012 | Raviv ................... G06F 21/554 726/22 |
| 2012/0297484 | A1 | 11/2012 | Srivastava |
| 2013/0035983 | A1 * | 2/2013 | Kursar et al. ................ 705/7.29 |
| 2013/0166646 | A1 * | 6/2013 | Oliver et al. ................. 709/204 |

(Continued)

*Primary Examiner* — Moustafa M Meky
*Assistant Examiner* — SM Z Islam
(74) *Attorney, Agent, or Firm* — Patricia B. Feighan (57) ABSTRACT

A method for securing a social network account assigned to a member is provided. The method may include determining at least one social network account assigned to the member, the member being in electronic communication with the at least one social network account via a communication network, using a software program on a computer having a processor for executing the software program. The method may also include determining a pattern of communications between the member and the at least one social network account and generating a profile for the at least one social network account assigned to the member based on the pattern of communications. The method may further include monitoring an electronic communication with the at least one social network account by the member based on comparing the generated profile with the electronic communication.

3 Claims, 6 Drawing Sheets

(56) References Cited

U.S. PATENT DOCUMENTS

2014/0149215 A1* 5/2014 Rajaram .......... G06F 17/30616
705/14.54

* cited by examiner

DATA ANALYTICS AND SECURITY IN SOCIAL NETWORKS

FIELD OF THE INVENTION

The present invention relates generally to the field of social networking using a computer on a communication network, and more particularly to the security risks regarding the use of multiple inter-connected social networks.

BACKGROUND

Computerized social networks provide a means of interaction among computer users through communities they build over time to share interests, activities and business connections.

Many people may have accounts in multiple social networks. Social network aggregation is the process of collecting content from multiple social network services, such as MySpace or Facebook. The process of collecting the content is often performed by a social network aggregator. A social network aggregator gathers information and stores it in a single location. This may help a user consolidate multiple social networking profiles into one profile. Various aggregation services provide tools or widgets to allow users to consolidate messages, track friends, combine bookmarks, search across multiple social networking sites, read rich site summary (RSS) feeds for multiple social networks, see when their name is mentioned on various sites, access their profiles from a single interface, provide "lifestreams", etc. Social network aggregation services attempt to organize or simplify a user's social networking experience by interconnecting multiple social network accounts assigned to the same person.

However, there may be security risks involved in having automatic synchronization of message posting across multiple social networks. There are plugins or aggregation programs that can bridge among multiple social networks so that when a user posts a message on one social network, the same message can be automatically posted in other authorized social networks. For example, if one account were to be hacked, the hacker may be able to control the other social media accounts assigned to the same user. As such, messages that are posted by the hacker may automatically be populated across multiple social networks owned by the same user and the user may not even be aware that any of their social media accounts have been hacked. Therefore, it may be advantageous, among other things, to provide enhanced security across shared accounts in social networks.

SUMMARY

According to at least one embodiment of the present invention, a method for securing a social network account assigned to a member is provided. The method may include determining at least one social network account assigned to the member, the member being in electronic communication with the at least one social network account via a communication network, using a software program on a computer having a processor for executing the software program. The method may also include determining a pattern of communications between the member and the at least one social network account and generating a profile for the at least one social network account assigned to the member based on the pattern of communications. The method may further include monitoring an electronic communication with the at least one social network account by the member based on comparing the generated profile with the electronic communication.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention relates generally to the sharing of multiple social network accounts assigned to a single user, and more particularly, to data analytics and security with respect to shared social networks assigned to a single user. The following described exemplary embodiments provide a system, method and program product to improve security by using data analytics across multiple shared social network accounts assigned to the same user.

Currently, social network aggregation platforms allow members to share their other social network activities across all their social network accounts, such as Twitter, YouTube, Facebook, Instagram and other major platforms. One can also integrate their blog posts and comments in the aggregation platform. Everything is shown in real time to other members who subscribe to a particular community. Social network aggregation eliminates the need to switch from one social media network to another in order to keep track of all the updates pertaining to one subscriber across multiple social media. For example, a single user may share messages among several of their social network accounts for convenience purposes so they do not have to login into each account to change their status or post a message.

However, as previously described, there may be security risks involved in having automatic synchronization of message posting across multiple social networks. Having such a convenience feature established, may result in multiple connected accounts having the risk of being hacked if one connected account is hacked. For example, if one account were to be hacked, faked messages that are posted by the hacker may automatically be populated across multiple social networks owned by the same user. For example, hackers may be able to solicit information from other social network users simply by posing as the user of the hacked account.

In one embodiment, data analytics are used to increase security across all social network accounts shared by a single user. The method generates a user profile based on a pattern of communications for each of the user's shared social network accounts and monitors the data integrity of the electronic communications by comparing the user's messages to the previously generated user profile for each of the shared social network accounts.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Currently, social network aggregation platforms allow members to share their social network activities via bridges among various social network accounts assigned to the user. The bridges allow auto-posting of messages across the user's shared social network accounts. For example, if a user posts a message on Twitter, a social network aggregation program may also automatically post the same message on Facebook via a bridge from Twitter to Facebook without the need for the user to have to log into their Facebook account.

The following described exemplary embodiments provide a system, method and computer program product to use a combination of stylometry (behavioral biometric) and metadata (social network attributes) to develop user persona in a social network. Stylometry is the application of the study of linguistic style. It usually applies to written language, but it can be applied to fine-art paintings and music as well. Stylometry may be used to attribute authorship to anonymous or disputed documents. Certain characteristics associated with the linguistic style are noted, such as a member's style of writing, a type of message being shared, a context of a message and an application used to post a message. For example, whether the text is written in all lower case or with all capital letters. Metadata (metacontent) are the data providing information about one or more aspects of the data, such as who created the posting, when the posting was created, what the content of the posting is, where the posting was created, how the posting was created, access control of the posting, and the IP address of the member creating the posting. For example, a digital image may include metadata that describe how large the picture is, the color depth, the image resolution, when the image was created, and other data. Similarly, a text document's metadata may contain information about how long the document is, who the author is, when the document was written, and a short summary of the document.

According to one embodiment, stylometry and metadata are extracted from historical message postings to establish a profile for each one of the user's shared social network accounts. The profile is based upon the user's persona on each of the shared social network accounts. Once the user's profile is established for each of their social network accounts, the shared social network accounts are monitored for abnormal behavior. Then, based on this established user profile, any abnormal behavior that does not fit into this user's persona, would be able to be detected. Once any abnormal behavior is detected, the user may be prompted with a security question. If the user is not able to answer the security question accurately (i.e. authenticate their identity), all bridges that allow auto-posting of messages across the user's shared social network accounts are disabled. Therefore, the hacker is prevented from gaining access to any additional social network accounts assigned to the user.

Figure 1:
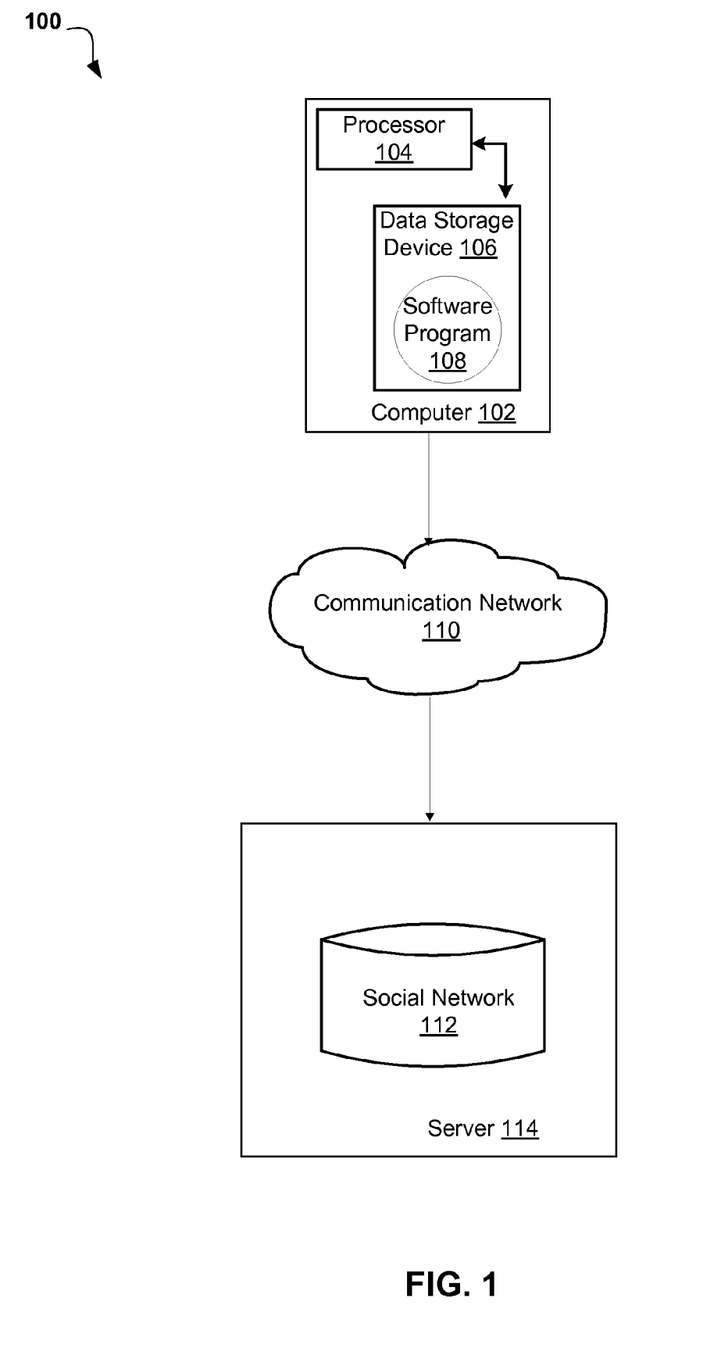
FIG. 1 illustrates a networked computer environment according to one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108. The networked computer environment 100 may also include a social network 112, a server 114 and a communication network 110. The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with social network 112 running on server computer 114 via the communications network 110. The communications network 110 may include connections, such as wire, wireless communication links, or fiber optic cables. As will be discussed with reference to FIG. 4, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of accessing a social network.

As previously described, the client computer 102 may access social network 112, running on server computer 114 via the communications network 110. For example, a user using an application program 108 (e.g., Firefox®) running on a client computer 102 may connect via a communication network 110 to one of their social network accounts 112 which may be running on server computer 114.

Figure 2:
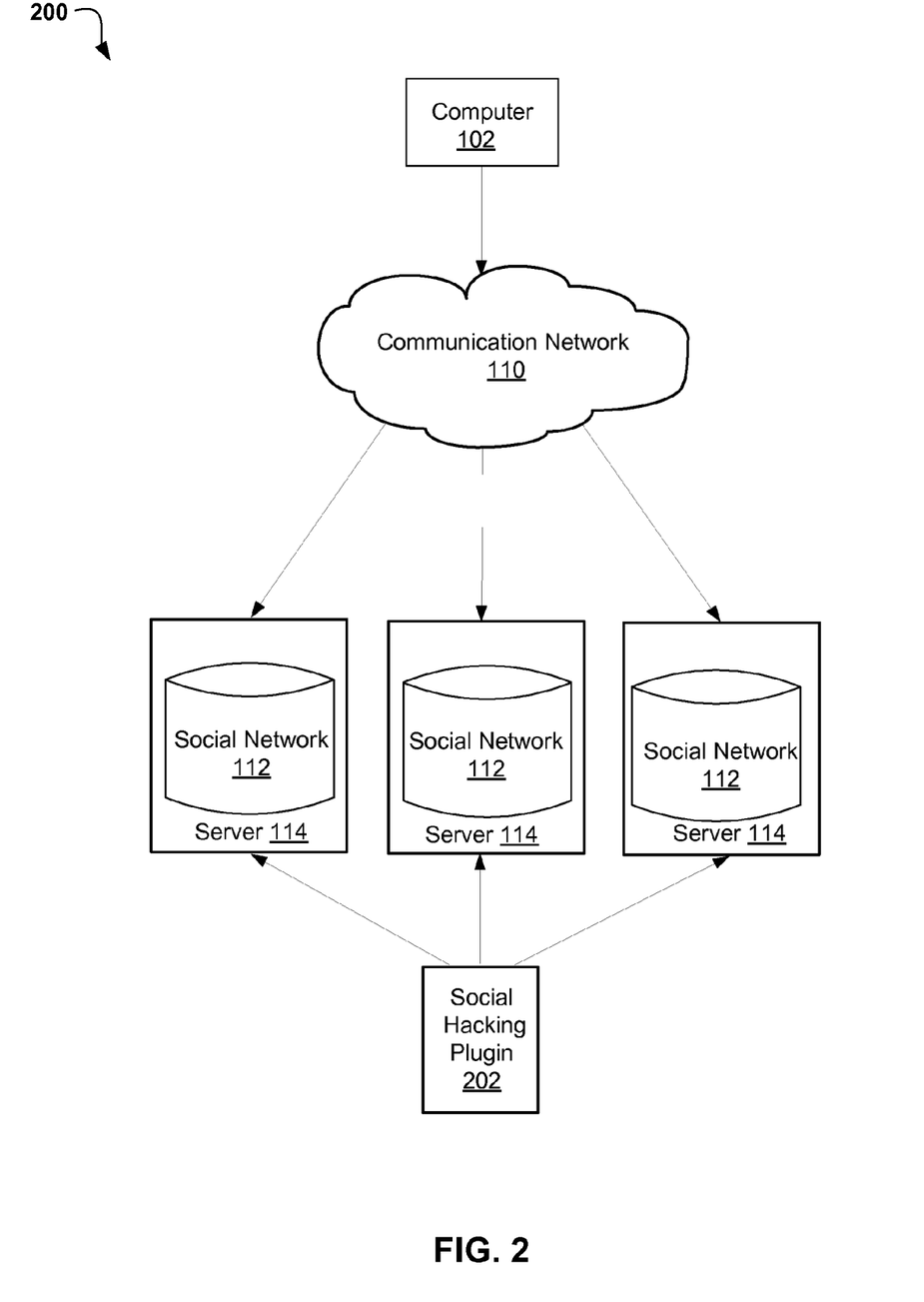
FIG. 2 illustrates a networked computer environment with an exemplary social hacking plugin according to one embodiment.

Referring now to FIG. 2, a networked computer environment with an exemplary social hacking plugin in accordance with one embodiment is depicted. Client computer 102 may communicate via a communication network 110 with one or more social networks 112 which may be running on a server computer 114. Social network security protection in accordance with at least one embodiment may be implemented as a social hacking plugin 202 to social network 112 which may be running on server computer 114.

A plugin is a computer program that interacts with a main application (a web browser or an email program, for example) to provide a certain, usually very specific, function. The main application provides services which the plugins can use, including a way for plugins to register themselves with the main application and a protocol by which data is exchanged with plugins. Plugins are dependent on these services provided by the main application and do not usually work by themselves. Conversely, the main application is independent of the plugins, making it possible for plugins to be added and updated dynamically without changes to the main application. For example, social hacking plugin 202 may be a computer program that provides data analytics and security to a social network 112, such as Twitter or Facebook (i.e. the main application).

Figure 3A:
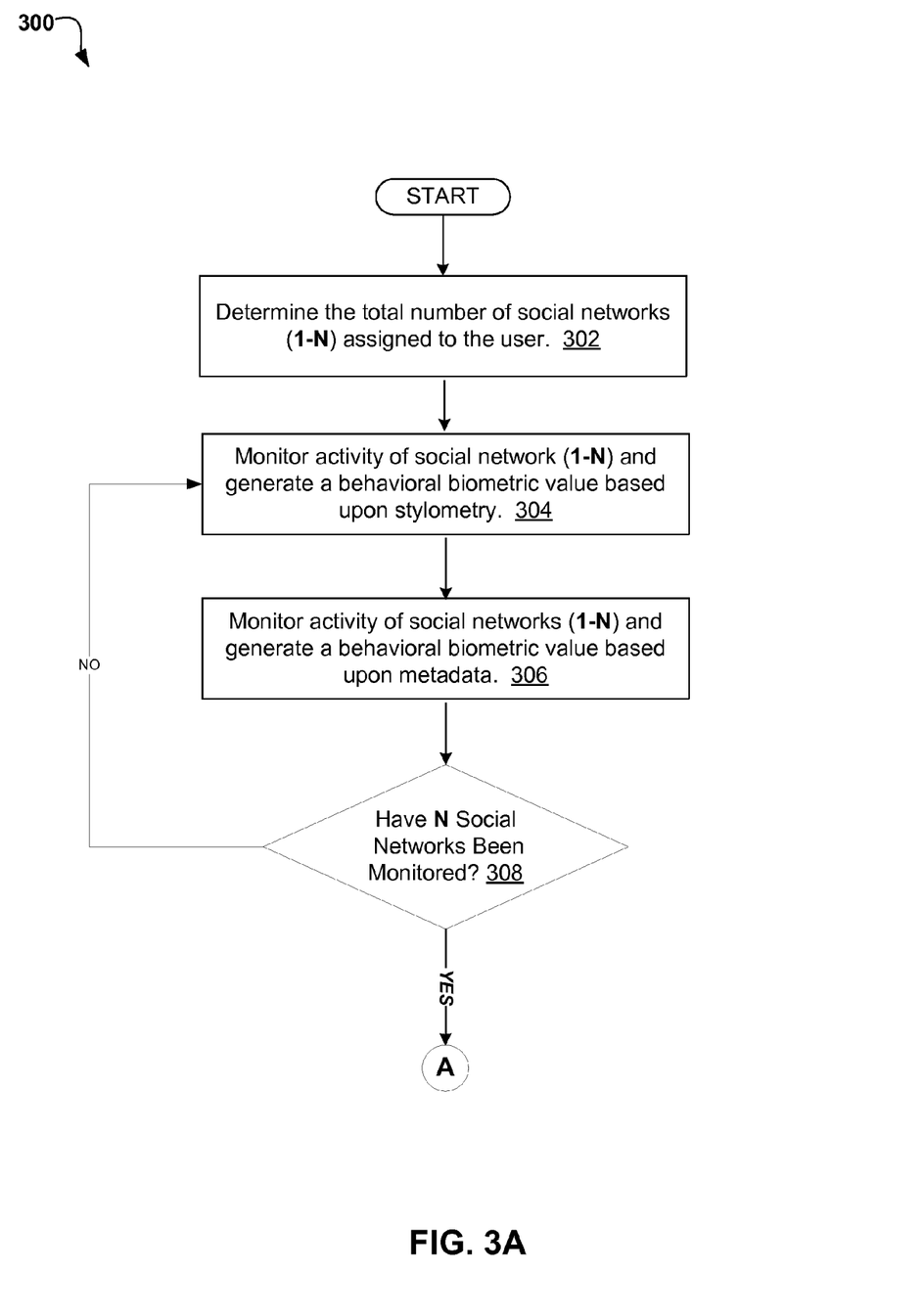
FIG. 3A-3C is an operational flowchart illustrating the steps carried out by a social hacking program according to one embodiment.
Figure 3B:
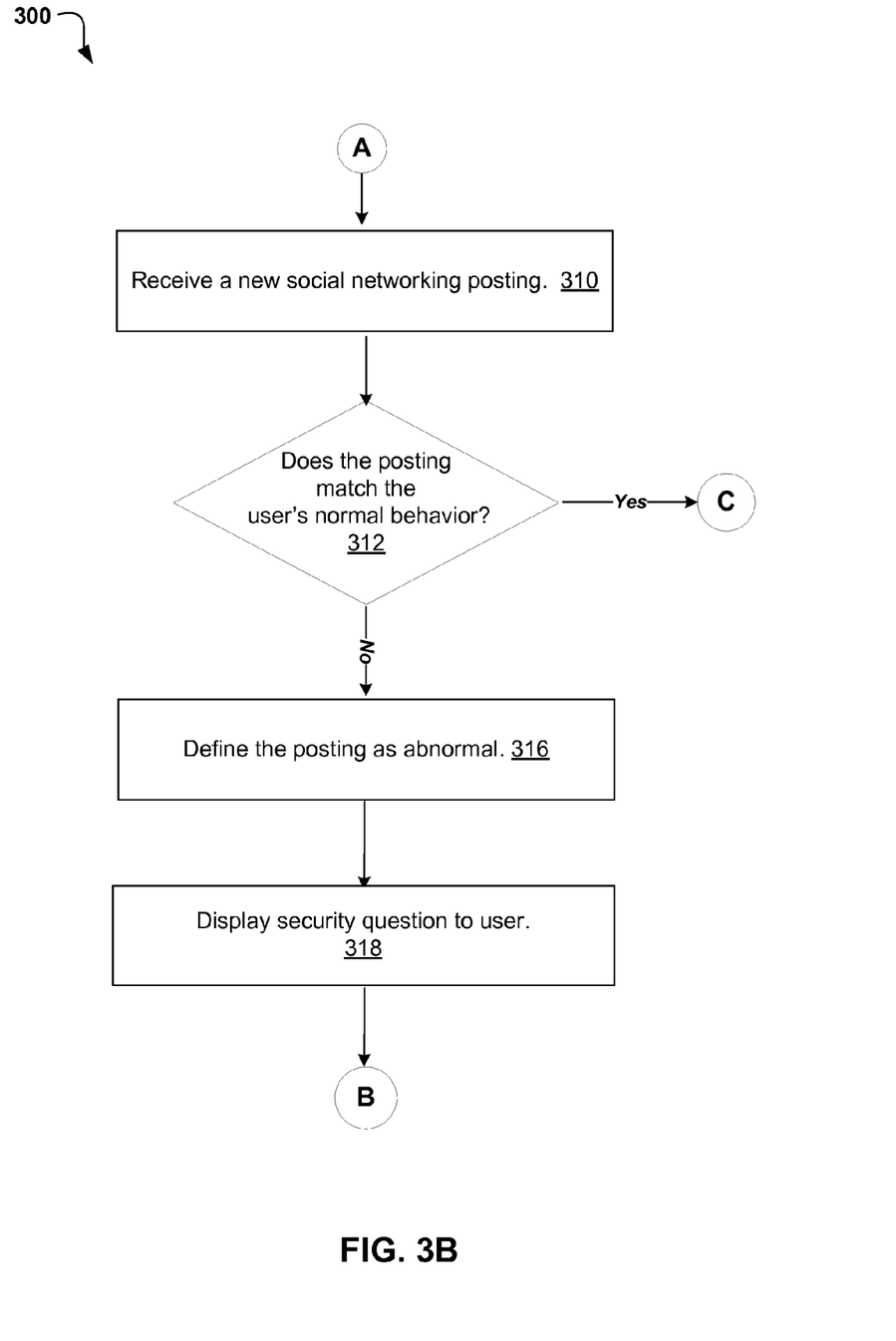
Figure 3C:
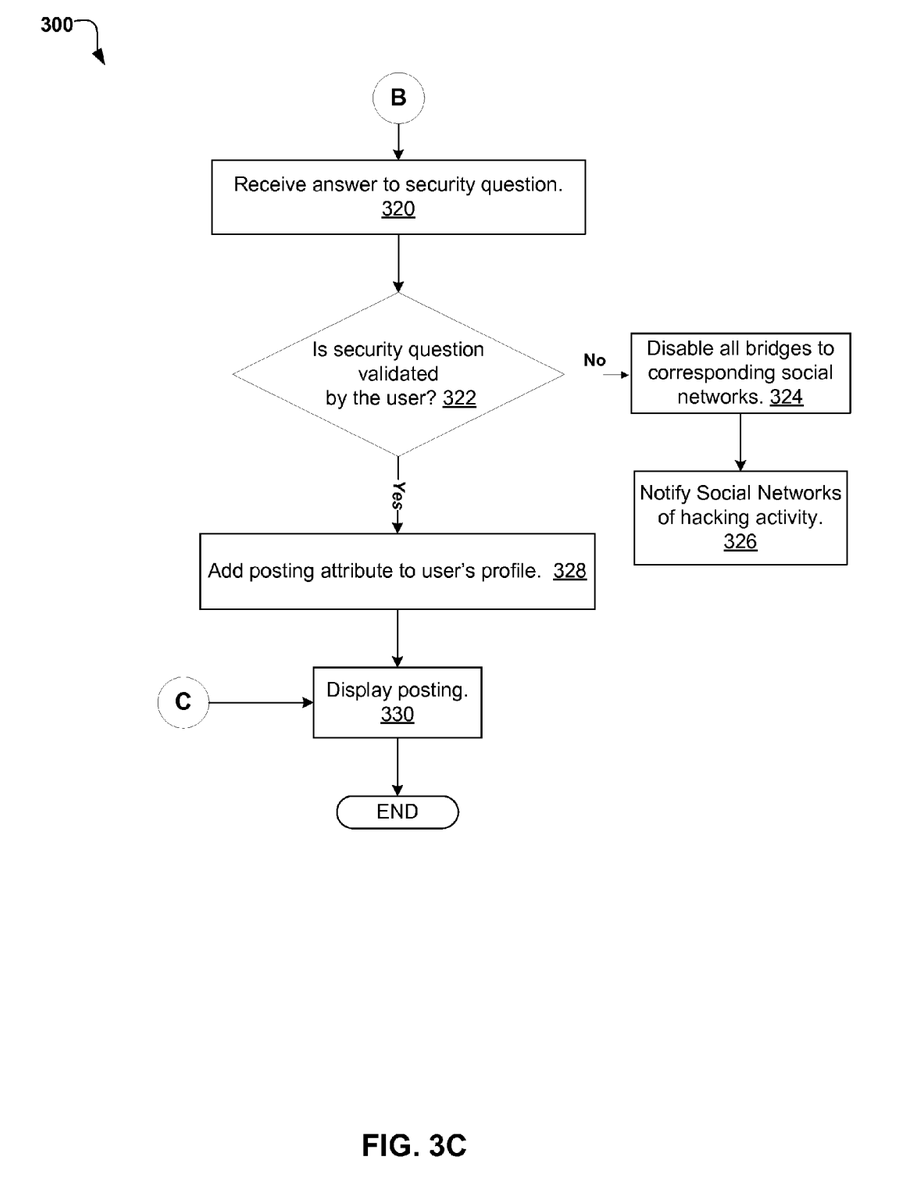

FIGS. 3A-3C is an operational flowchart illustrating the steps carried out by social hacking plugin 202 (FIG. 2) in accordance with an embodiment of the present invention. For example, the embodiment may be implemented as a social hacking plugin 202 that interacts with a social network 112 (i.e. the main application) which may be running on server 114 and provides data analytics and security to aid in the protection against multiple shared social network accounts being hacked when the security on one shared account has been compromised. The plugin may, for example, be displayed to the user using a graphical user interface (GUI) in order to obtain the necessary information needed to provide security protection. This information may include, but is not limited to, the names of all the shared social network accounts assigned to the user and security questions and answers that may be later used to authenticate the user's identity. The security protection as performed by social hacking plugin 202 interacting with social network 112 which may be running on server computer 114 is explained in more detail below with respect to FIGS. 3A-3C.

Referring to FIG. 3A, at 302 the total number of social networks assigned to the user is determined. For example, the user may be prompted with a graphical user interface which guides the user into disclosing the type and total number of social network accounts that are linked via a social network aggregator. As previously described, a social network aggregator allows members to share their social network activities among multiple linked social network accounts assigned to the user. The accounts are linked via bridges. Bridges are software programs that interface with multiple social networks on behalf of end users. A bridge can be a standalone software program offered by a third party software vendor to link multiple social networks together, or it can be a software capability offered by one of the social networks. Users need to authorize bridges to connect on behalf of them across multiple social network accounts as a setup. Messages that a user posts in one social network can be automatically posted in another social network. For example, a user may post a message on Twitter and the same message may automatically be displayed on Facebook via a social network aggregator without the user ever having to log into the Facebook account. As such, at 302 (FIG. 3A), the various linked social network accounts assigned to the user are determined.

At 304, activity on each of social network accounts is monitored in order to generate a profile comprising behavioral biometric values based upon the stylometry of the user and the metadata of the user's message posting provide by social networks. As previously discussed, stylometry is the application of the study of linguistic style. Stylometry features include but are not limited to lexical features (such as word or character count), syntactic features (such as use of function words or punctuation), structural features (such as text fonts, colors), and content-specific features (such as choice of words or topic domain). In computer security, biometrics refers to authentication techniques that rely on measurable physical characteristics that can be automatically checked. Therefore, at 304, social hacking plugin 202 will monitor the user's activity on each social network and develop a profile based upon the stylometry of the user. For example, a user may always create messages in lowercase, never use any punctuation and always ends their messages with a graphic or emoticon (i.e. smiley face, etc). As such, social hacking program 202 would generate a profile based upon these characteristics in order to be able to identify if a message was not created by the user. For example, a message created on the user's social network account would not fit the profile of the user in the above example if it was created using all capital letters, punctuation and no graphic or emoticons. In another example, a user may never discuss political matter in a social network. If a message is posted by the user with political content, this posting does not fall into the usual behavior of the user and it will be raised as suspicious.

Referring now to 306, activity on each of social network accounts is monitored in order to generate a profile that includes behavioral biometric values based upon the metadata of the messages created by the user. As previously described, metadata (metacontent) is the data providing information about one or more aspects of the data, such as the means of creation of the data; purpose of the data; time and date of creation of the data; creator or author of the data; the access control associated with the data; location on a computer network where the data was created and the standards used to create the data. Therefore, at 306, social hacking plugin 202 will monitor the user's activity on each social network and develop a profile based upon the metadata of the messages created by the user. For example, a user may always create messages in the morning and only on a weekday. As such, social hacking program 202 would generate a profile based upon these characteristics in order to be able to identify if a message was not created by the user. For example, a message created on the user's social network account would not fit the profile of the user in the above example if it was created at night and on a Saturday.

At 308, social hacking plugin 202 would determine if all social networks assigned to the user were monitored and a profile was created for each social network account. If all social network accounts assigned to the user have not been monitored, then social hacking plugin will continue to monitor all the remaining social networks assigned to the user and generate a profile based upon the stylometry of the user and the metadata of the messages for each social network account.

If, at 308, it is determined that all social network accounts assigned to the user have been monitored and a profile has been generated for each account, social hacking plugin 202 may begin to monitor the messages created by the user on each social network account assigned to the user in order to identify abnormal behavior. Abnormal behavior may be any message or posting created on the user's social network account that does not fit the previously generated profile of the user for that social network account.

As such, at 310 (FIG. 3B), social network plugin 202 (FIG. 2) receives a new social networking posting on a social network account assigned to the user. Then at 312, social network plugin 202 determines if the posting matches the user's normal behavior by comparing it to the profile that was previously generated for the user on that social network account. For example, if the user's profile indicates that whenever the user posts a message to their mother, it is usually posted in the morning and they refer to their mother as "mom". As such, if the posting in this particular example is posted at night and refers to the user's mother as "mother", then social hacking plugin 202 would determine that the posting does not match the profile for the user associated with that social network.

If, at 312, the posting matches the user's previously determined profile, then the posting is displayed at 330. With respect to the example above, if social hacking plugin 202 determines that the user posted a message to their mother in the morning and referred to their mother as, "mom", then the posting would match the previously determined profile for the user associated with that particular social network account and as such, the posting would be displayed.

If, at 312, social hacking plugin 202 determines the posting does not match the profile for the user on this particular social network account, then the posting will get defined as abnormal at 316. For example, a user may always create messages in the afternoon, only on a weekends and using only capital letters. As such, social hacking program 202 would define a posting as abnormal if the posting was created in the morning, on a Monday and using only lowercase.

If social hacking plugin 202 determines the posting is abnormal (i.e. does not match the user's profile for that particular social network account), then, at 318, a security question may be displayed to the user to validate the user's authenticity. For example, if social hacking plugin 202 determined that the posting created by the user does not match the previously generated profile for the user on that particular social network account (i.e. it was created in the morning, on Monday and using only lowercase letters as in the example above), then social hacking plugin 202 would post a security question to the user to validate the user's authenticity. For example, if it suspected that the person posting the message is not the user assigned to the social network account, then social hacking plugin 202 may prompt the user with a personal question, such as the name of the street where their first house was located.

Referring now to 320 (FIG. 3C), social hacking plugin 202 receives an answer to the security question previously displayed to the user. Then at 322, social hacking plugin 202 determines whether the security question was validated by the user. The security question is validated by the user if the user provides the correct answer to the security question.

If at 322, it is determined that the user has not validated their authenticity by properly answering the security question, then at 324, all the network bridges that link the social network account in question to all the other shared social network accounts assigned to the user are disabled. As previously described, social network aggregation platforms allow members to share their social network activities via bridges among various social network accounts assigned to the user. The bridges allow auto-posting of messages across the user's shared social network accounts.

Then at 326 social hacking plugin 202 notifies all of the shared social network accounts of the security breach. For example, social hacking plugin 202 may generate an email notification to the shared social network accounts apprising them of the security breach or potential security breach.

If at 322, social hacking plugin 202 determines that the security question was validated by the user, then at 328 the posting attribute is added to the user's profile for that particular social network account assigned to the user and then the posting is displayed at 330. For example, if the user always creates a message on Mondays and the posting in question was created on a Saturday, then Saturday would be added as an attribute to the user's profile and the posting would be displayed.

Figure 4:
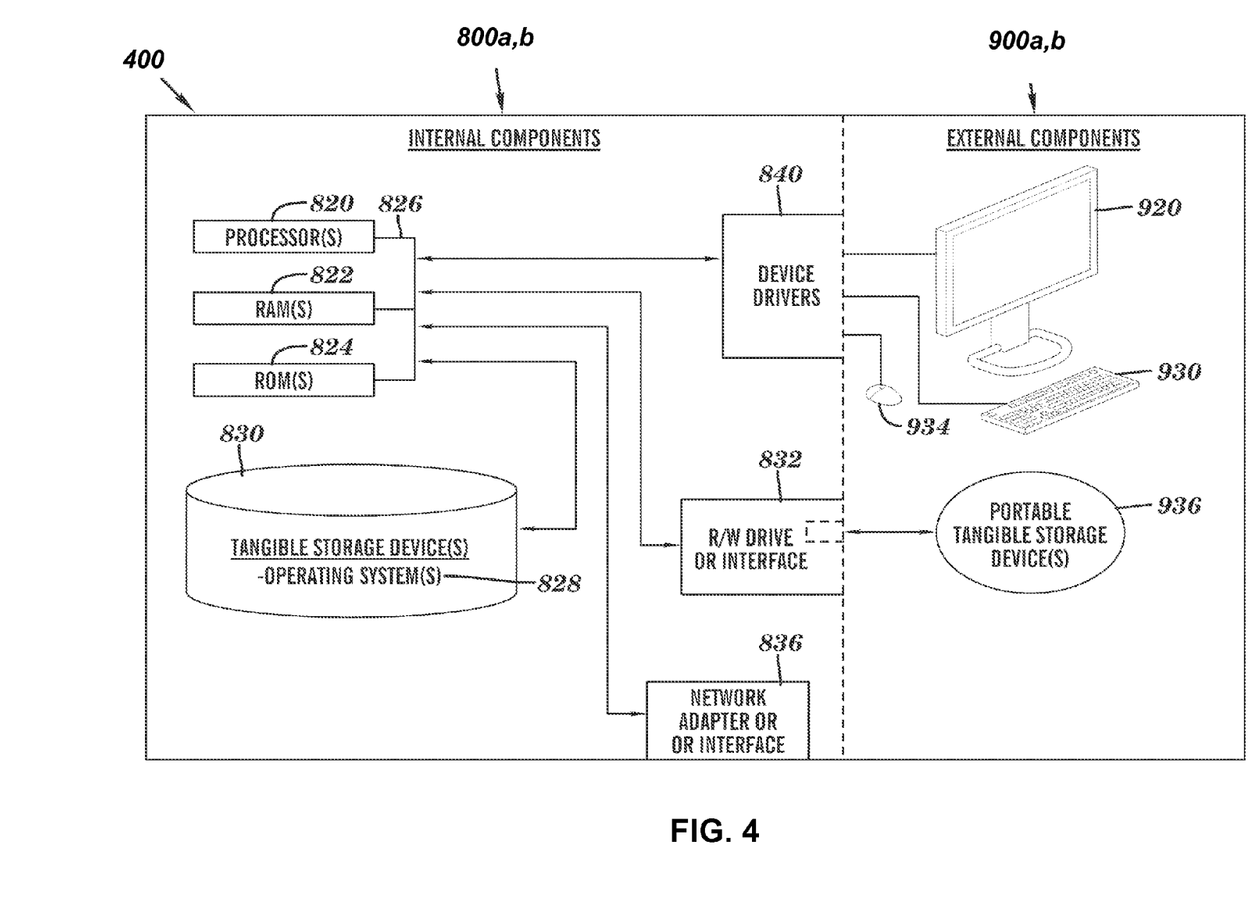
FIG. 4 is a block diagram of internal and external components of computers and servers depicted in FIG. 1.

FIG. 4 is a block diagram of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102, and network server computer 114 include respective sets of internal components 800a, b and external components 900a, b illustrated in FIG. 4. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and program 108 in client computer 102 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, c also includes a R/W drive or interface 832 to read from and write to one or more portable computer-readable tangible storage devices 936 such as a CD-ROM, DVD, memory stick, magnetic tape, magnetic disk, optical disk or semiconductor storage device. The social hacking plugin 202 can be stored on one or more of the respective portable computer-readable tangible storage devices 936, read via the respective R/W drive or interface 832 and loaded into the respective hard drive 830.

Each set of internal components 800a, b also includes network adapters or interfaces 836 such as a TCP/IP adapter cards, wireless wi-fi interface cards, or 3G or 4G wireless interface cards or other wired or wireless communication links. The program 108 in client computer 102 and social network program 112 in network servers 114 can be downloaded to client computer 102 from an external computer via a network (for example, the Internet, a local area network or other, wide area network) and respective network adapters or interfaces 836. From the network adapters or interfaces 836, the program 108 in client computer 102 and the social network program 112 in network server computer 114 are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention as defined by the accompanying claims.

What is claimed is:

1. A method for securing a social network account assigned to a member, the method comprising:
   determining at least one social network account assigned to the member, the member being in electronic communication with the at least one social network account via a communication network, using a software program on a computer having a processor for executing the software program;
   determining, by the processor, a pattern of communications between the member and the at least one social network account;
   generating, by the processor, a profile for the at least one social network account assigned to the member based on the pattern of communications, wherein the pattern of communications is determined by extracting a plurality of stylometry and metadata from a plurality of historical message postings associated with the member, wherein the plurality of stylometry includes a member's style of writing, a type of message being shared, a context of a message, and an application used to post a message, and wherein the metadata includes who created the posting, when the posting was created, what the content of the posting is, where the posting was created, how the posting was created, access control of the posting, and the IP address of the member creating the posting;
   monitoring, by the processor, an electronic communication with the at least one social network account by the member, wherein the monitoring comprises:
      receiving a new social network posting at the at least one social network account;
      analyzing the new social network posting; and
      disabling all bridges to any other social network account associated with the member in response to determining, based on a comparing, that the new social network posting is not in accordance with the generated profile and a failure to authenticate the member's identity, wherein the authentication of the member's identity is verified based on a security question posted to the member;
   adding a plurality of attributes associated with the received new social network posting to the generated profile, wherein the adding is performed based on the member's identity being authenticated, and wherein the added plurality of attributes includes words describing a day of a week and a time of the day;
   displaying the received new social network posting based on the plurality of attributes associated with the received new social network posting being added to the generated profile; and
   sending a hacking notification to all social network accounts when the new social network posting is not in accordance with the generated profile.

2. A computer system for securing a social network account assigned to a member, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, the program instructions comprising:
   program instructions to determine at least one social network account assigned to the member, the member being in electronic communication with the at least one social network account via a communication network, using a software program on a computer having a processor for executing the software program;
   program instructions to determine, by the processor, a pattern of communications between the member and the at least one social network account;
      program instructions to generate, by the processor, a profile for the at least one social network account assigned to the member based on the pattern of communications, wherein the pattern of communications is determined by extracting a plurality of stylometry and metadata from a plurality of historical message postings associated with the member, wherein the plurality of stylometry includes a member's style of writing, a type of message being shared, a context of a message, and an application used to post a message, and wherein the metadata includes who created the posting, when the posting was created, what the content of the posting is, where the posting was created, how the posting was created, access control of the posting, and the IP address of the member creating the posting;
   program instructions to monitor, by the processor, an electronic communication with the at least one social network account by the member, wherein the monitoring comprises:
   program instructions to receive a new social network posting at the at least one social network account;
      program instructions to analyze the new social network posting; and
   program instructions to disable all bridges to any other social network account associated with the member in response to determining, based on a comparing, that the new social network posting is not in accordance with the generated profile and a failure to authenticate the member's identity, wherein the authentication of the member's identity is verified based on a security question posted to the member;

program instructions to add a plurality of attributes associated with the received new social network posting to the generated profile, wherein the adding is performed based on the member's identity being authenticated, and wherein the added plurality of attributes includes words describing a day of a week and a time of the day;

program instructions to display the received new social network posting based on the plurality of attributes associated with the received new social network posting being added to the generated profile; and sending a hacking notification to all social network accounts when the new social network posting is not in accordance with the generated profile.

3. A computer program product for securing a social network account assigned to a member, the computer program product comprising:

one or more computer-readable storage devices and program instructions stored on at least one of the one or more tangible storage devices, the program instructions comprising:

program instructions to determine at least one social network account assigned to the member, the member being in electronic communication with the at least one social network account via a communication network, using a software program on a computer having a processor for executing the software program;

program instructions to determine, by the processor, a pattern of communications between the member and the at least one social network account;

program instructions to generate, by the processor, a profile for the at least one social network account assigned to the member based on the pattern of communications, wherein the pattern of communications is determined by extracting a plurality of stylometry and metadata from a plurality of historical message postings associated with the member, wherein the plurality of stylometry includes a member's style of writing, a type of message being shared, a context of a message, and an application used to post a message, and wherein the metadata includes who created the posting, when the posting was created, what the content of the posting is, where the posting was created, how the posting was created, access control of the posting, and the IP address of the member creating the posting;

program instructions to monitor, by the processor, an electronic communication with the at least one social network account by the member, wherein the monitoring comprises:

program instructions to receive a new social network posting at the at least one social network account;

program instructions to analyze the new social network posting; and program instructions to disable all bridges to any other social network account associated with the member in response to determining, based on a comparing, that the new social network posting is not in accordance with the generated profile and a failure to authenticate the member's identity, wherein the authentication of the member's identity is verified based on a security question posted to the member;

program instructions to add a plurality of attributes associated with the received new social network posting to the generated profile, wherein the adding is performed based on the member's identity being authenticated, and wherein the added plurality of attributes includes words describing a day of a week and a time of the day;

program instructions to display the received new social network posting based on the plurality of attributes associated with the received new social network posting being added to the generated profile; and sending a hacking notification to all social network accounts when the new social network posting is not in accordance with the generated profile.

* * * * *